United States Patent [19]

Kotzab

[11] Patent Number: 5,427,720
[45] Date of Patent: Jun. 27, 1995

[54] METHOD FOR MOLD TEMPERATURE CONTROL

[76] Inventor: Werner Kotzab, Heinestrasse 7, D-97422 Schweinfurt, Germany

[21] Appl. No.: 201,976

[22] Filed: Feb. 25, 1994

[30] Foreign Application Priority Data

Mar. 9, 1993 [DE] Germany .................. 43 07 347.6

[51] Int. Cl.⁶ .............................................. B29C 45/73
[52] U.S. Cl. .............................. 264/40.6; 264/328.16; 425/144; 425/548
[58] Field of Search ............... 264/40.1, 40.6, 328.16; 425/143, 144, 547, 548, 552

[56] References Cited

U.S. PATENT DOCUMENTS

| | | | |
|---|---|---|---|
| 3,763,293 | 10/1973 | Nussbaum | 425/145 |
| 4,354,812 | 10/1982 | Wieder et al. | |
| 4,420,446 | 12/1983 | Wieder et al. | |
| 4,586,690 | 5/1986 | Härtel et al. | 425/144 |
| 4,690,789 | 9/1987 | Ritchie et al. | 425/144 |
| 4,902,454 | 2/1990 | Steinbichler | 264/40.6 |

FOREIGN PATENT DOCUMENTS 2035715 1/1972 Germany .
3027986 11/1983 Germany .
4027791 10/1991 Germany .

*Primary Examiner*—Jill L. Heitbrink
*Attorney, Agent, or Firm*—Laff, Whitesel, Conte & Saret, Ltd.

[57] ABSTRACT

The invention relates to a method of controlling the temperature of an injection mold, in particular for plastics and aluminium diecasting. The molten material being pressure-fed into the mold recess or the mold recesses of an injection mold by means of an extruder or the like in recurring cycles, cured therein, removed from the mold, and pressure-melted material being again supplied with the start of another cycle. A plurality of flow control valves are controlled by a sensor to provide an impulse or intermittent flow of the temperature control medium during each molding cycle at the same point in time as the previous cycle. The sensor compares a calculated temperature for a determined point in time of a molding cycle with the actual temperature of the molding cycle for that point in time and triggers the flow of temperature control medium for a set period of time to adjust the temperature of the molding cycle. This provides a more exact method of injection molding.

9 Claims, 2 Drawing Sheets

METHOD FOR MOLD TEMPERATURE CONTROL

BACKGROUND OF THE INVENTION

1. Field of the Invention

The invention relates to a method of controlling the temperature of an injection mold during each molding cycles of recurring molding cycles. A single molding cycle consists of pressure feeding molding material into the mold recess or the mold recesses of an injection mold, curing the material therein, and removing the molded material from the mold.

Applicant's method controls the temperature of the injection mold by comparing a present nominal temperature to an actual measured temperature, said actual temperature being measured by at least one temperature sensor. An amount of a cooling and heating medium is intermittently supplied to each molding cycle depending on the deviation of the measured actual temperature from the desired nominal temperature of the molding cycle. The comparison of the actual temperature and the nominal temperature is performed during each cycle at at least one point of time for each single molding cycle period. The method of controlling the temperature is suitable for use with plastic and aluminum die casting.

2. Background Art

A known method is shown in U.S. Pat. No. 4,420,446 or U.S. Pat. No. 4,354,812. In these known methods, the temperature of the injection mold is continuously sensed by means of a probe, and compared with a nominal value and, depending on whether the measured temperature exceeds or falls short of the desired nominal temperature, cooling fluid, in particular cooling water, is supplied through cooling channels or switched off. This method works without specifically taking into account the temperature distribution and the need of a cooling medium in the respective mold, these values varying extremely from case to case depending on the geometry and size of the mold. Consequently, optimal temperature distribution cannot be achieved with the known method. But optimal temperature control is needed to ensure a method which provides quality of the final product on the one hand, and achieves optimally short cycle times on the other hand. Cycle times must be adequately long enough to ensure sufficient curing of the molten material in the mold prior to ejection, but short enough to avoid excessive dwell times of the molded part of the mold. Temperature control must also be taken into account. Temperature control must ensure that even the most remote end of the mold recess, even for rather long mold channels, be reached by the still fluid injection-molding compound so that no cavities remain. On the other hand, the temperature control must be precise enough to avoid over heating the mold so as to require more of a cooling medium than necessary to be supplied for cooling and curing the molded part and thus increasing the amount of cooling time that has to pass.

SUMMARY OF THE INVENTION

It is accordingly an object of the invention to embody a method of the type mentioned at the outset such that the cycle times are minimized while an optimum injection molding quality is guarded.

According to the invention this object is attained in that a plurality of flow control valves for the cooling and heating medium are controlled via a sensor, in that the quantitative spatial distribution of coolant needed for the mold used in each case and the conduits provided in this mold for the coolant or the heating agent are determined empirically or by calculation. A comparison of the nominal and the actual temperature of the one sensor is performed for each cycle at at least one definite point of time of the cycle period and a plurality of flow control valves are triggered depending on the deviation of temperature determined and in dependence on the stored profile of quantitative spatial distribution of the coolant or the heating agent. Accordingly, a particular solution according to the invention exists in that an individualisation of the process of temperature control is effected in consideration of the geometry of the mold, which is then correspondingly considered in each individual readjustment operation, and the adjustment is made cyclically such that it is synchronized with the cycle of the injection process or compares to corresponding points of time of the cycle with each other. This helps to avoid averaging and thus deviations of the temperature from the set point can be recognized earlier and corrected more specifically. For instance, when heat is supplied, a carrying-off of heat is achieved with the same timing as for the supply of heat; the quantity of heat supplied at a time being correspondingly again carried off. Therefore, extreme overshooting of the temperature control system can be precluded and the injection process can be optimally adjusted on totally different injection molds with the same control.

Another advantage of the invention is that the flow per cycle of cooling or heating medium is given by presetting the time of opening of each individual flow control valve in each individual cycle. This time of opening can be electronically controlled very simply and very precisely, quantitative proportioning taking place is not only dependant on the set-point deviation but also is dependant on the stored profile of spatial distribution, i.e. on the position of each individual flow control valve.

It can be provided that a flow measuring turbine is associated with each flow control valve to detect the actual flow in each cycle and that the proportioning of the cooling or heating medium is effected in dependence on a comparison of the nominal flow to the actual flow. The rotation of such a measuring turbine can be transferred into pulses for instance inductively or by IR sensors, the number of pulses per time being proportional to the actual flow, so that for instance the nominal flow can be fixed by the presetting of a corresponding number of pulses. Correspondingly, it is possible to achieve optimal proportioning of the cooling medium regardless of how the pressure ratios of the cooling medium are influenced by the individually provided number of cooling conduits and/or the opening of valves connected in parallel or in sequence. The dependence on the base line pressure is eliminated in this way, too.

Alternatively it is conceivable to preset the flow rate of each individual flow control valve by means of the degree to which the latter is opened, i.e. by the cross-sectional throughput.

It is fundamentally conceivable, with the aid of the method according to the invention, not only to control the supply of the cooling medium, but also to supply a heating medium so as to ensure the maintenance of the melting status in remote areas of the mold.

An electric heating device triggered in like manner is fundamentally conceivable beside the use of a fluid heating medium.

Advantageously, the phase in the respective cycle can be determined from the periodicity (minimum-maximum) of the cycle-dependent temperature curve at the sensor. Consequently, in the cycle of injection and ejection, the phase is the relative point of time, referred for instance to the start of the cycle, which is preset by a new injection operation and the accompanying heating until a maximum temperature is reached and the subsequent cooling to the original molding. The comparison of the nominal and the actual value takes place at a definite phase or at several different, but nevertheless definite, phases.

Alternatively it can also be provided that the phase is determined in the respective cycle in dependence on the working cycle of the extruder or the like. Correspondingly, a triggering signal for the extruder can for instance be used simultaneously as a signal for triggering the flow control valves.

In the following the invention is specified on the basis of an example of embodiment take in conjunction with drawing.

DESCRIPTION OF THE PREFERRED EMBODIMENT

Figure 1:
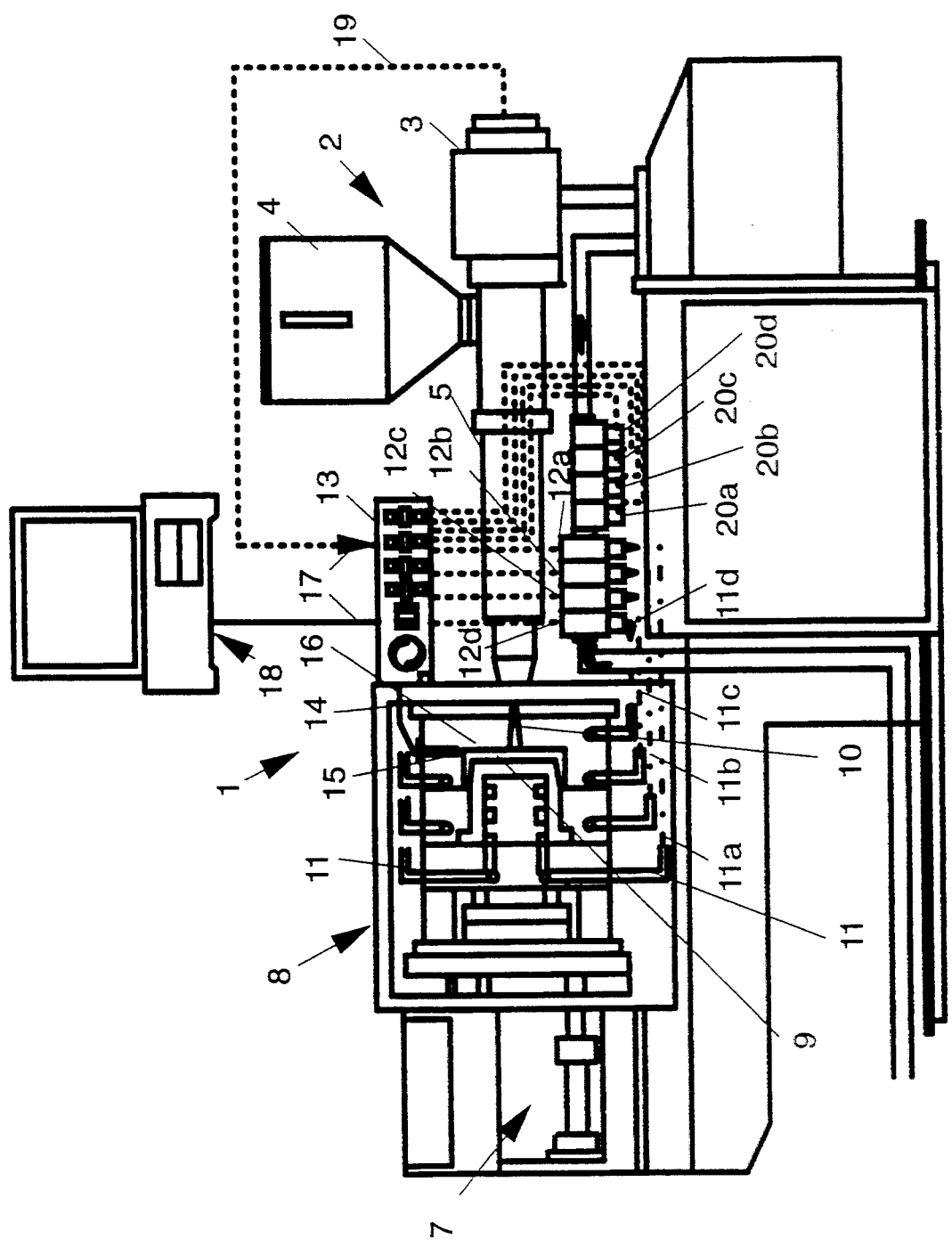
FIG. 1 is a diagrammatic illustration of an injection molding machine on which the method according to the invention is put into practice.

An injection molding machine 1 is illustrated in FIG. 1 which comprises an extruder 2 with a motor 3, a feed hopper 4 and a screw housing 5 and a discharge nozzle 6 opening into an injection mold 8 arranged subsequently, and positioned and closed by a tumbler 7.

The injection mold 8 comprises a mold recess 9 and injection channels 10 piloting the fluid plastic material into the mold recess.

A plurality of conduits 11 for the cooling medium, cold water as a rule, are arranged around the mold recess.

The conduits 11 for the cooling medium are divided into different circles 11a, 11b, 11c and 11d each surrounding a certain local portion of the injection mold 8. Of course, depending on the specific geometry of the injection mold 8, a greater or smaller number of circles may be provided instead of the four circles shown in the example of embodiment.

A flow control valve 12 to 12d is associated with each of these circles 11a to 11d. Each flow control valve 12 is controlled by a control device 13. An input 14 of the control device 13 is connected with a temperature sensor 15 detecting the temperature on the wall 16 of the mold recess 9. Via lines 17, diagrammatically outlined, the control device 13 further is in connection with an industrial computer 18, which is outlined as an external apparatus in the example of embodiment, but which may also be integrated in the control device 13. The control device 13 also controls the motor 3 via the line 19 and thus the injection molding process.

Figure 2:
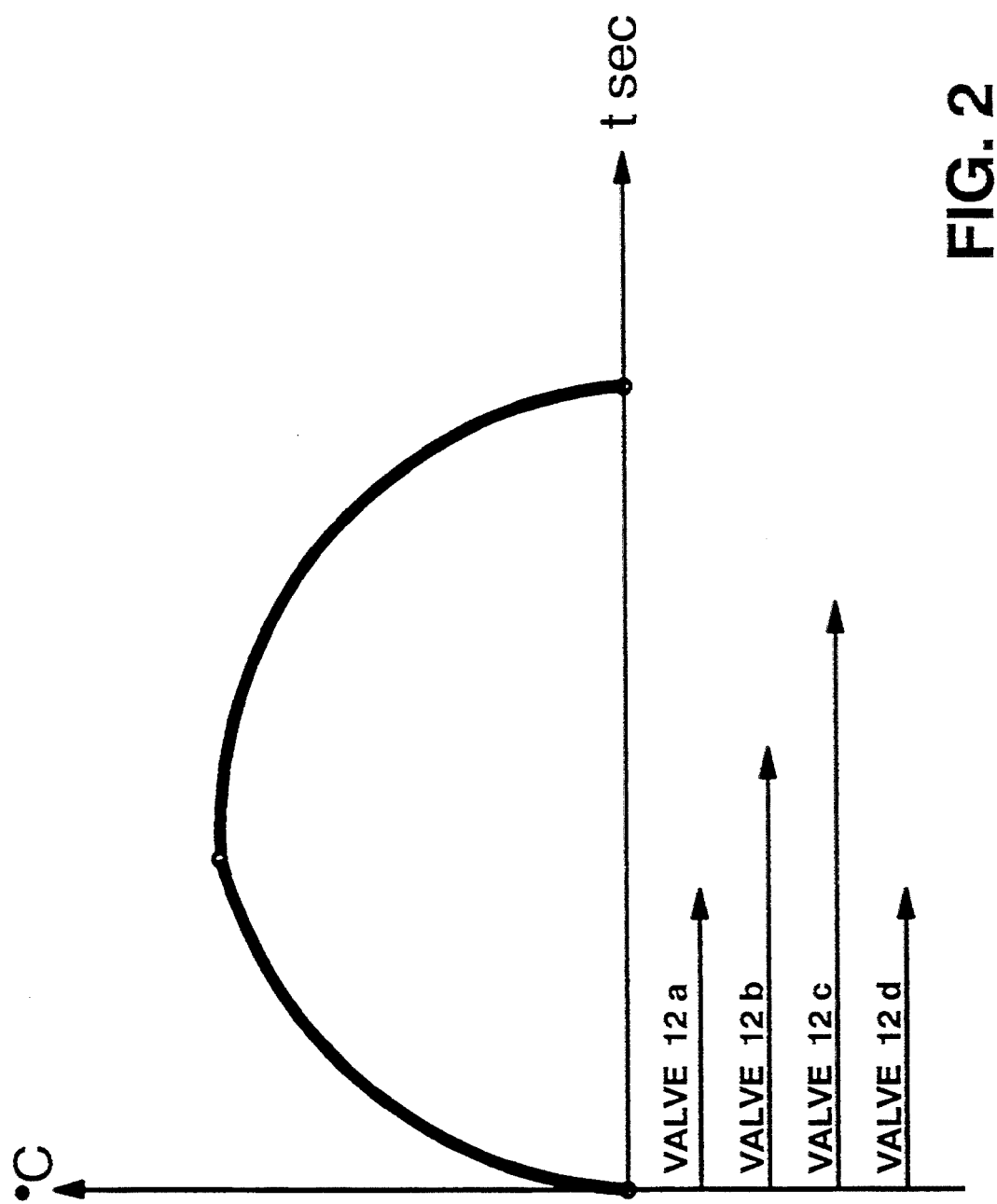
FIG. 2 is a diagram to illustrate the temperature curve in dependence on the time for an injection molding cycle and the opening times of the individual valves.

A molding cycle of an injection molding process is shown in FIG. 2, namely the temperature curve on the wall of the mold in dependence on the proceeding course of time. At the point of time O, the wall of the mold has a certain preset temperature, this temperature increasing due to the pressure-injection of the hot molten material until a maximum temperature is reached, the temperature then decreasing again under the influence of the cooling by the cooling medium in cooling conduits 11 and by the molten material cooling down. Then the cooled molded part is ejected and a new cycle starts.

The cooling conduits 11a to 11d separated from each other are triggered for differently long times depending on the specific geometry by the flow control valves 12a to 12d. The geometry-dependent distribution of triggering time to the individual cooling-conduit circles 11a to 11d is determined in advance for each mold 8 either empirically or by mathematical approximation and stored in the industrial computer 18. This preset profile is then still superimposed by the possible deviation, detected by the sensor 15, of the actual temperature from the nominal temperature, measuring and comparison taking place each at the zero point of the cycle outlined in FIG. 2. Correspondingly, an extension or reduction of the opening times of the valves 12a to 12d, while the distribution profile is guarded, will ensure that for each injection molding cycle and thus for each cooling cycle as much heat is carried off as has been supplied.

A flow measuring turbine is outlined at 20 which measures the actual flow at each flow control valve 12a to 12d. The rotation of the flow measuring turbine can be transferred into pulses for instance inductively or by IR sensors, which pulses are in turn compared with nominal numbers of pulses, stored in the computer 18, corresponding to nominal flow quantities. When such a flow measuring turbine is used, it is also possible to detect, via the computer, what is the quantity of cooling medium actually supplied that will lead to a certain temperature decrease. This can be realized either by a self-learning mode of operation of the computer based on preceding cooling cycles or by memorization of corresponding, theoretically detected values. Correspondingly, when a certain deviation of the actual value from the nominal value is found, it is possible by means of the computer 18 to make the proportioning of cooling water such that precisely such a quantity of cooling water is metered into the cooling conduits and the cooling lines as is sufficient to achieve the temperature decrease required to again reach the set point.

The temperature sensor 15 which detects the acutal temperature can be arranged in the vicinity of the wall of the mold as described or in the zone of return of the cooling medium, the return temperature of the cooling medium being a direct reference for changes of temperature in the vicinity of the mold.

What is claimed is:

1. An improved method of controlling the temperature of an injection mold by pressure feeding molding material into a mold recess of an injection mold by an extruder curing the material in the mold, and removing molded material from the mold, said pressure feeding, curing, and removing being a molding cycle of recurring molding cycles and said recurring molding cycles having at least a first molding cycle and a second molding cycle, comparing a preset nominal temperature to an actual temperature measured by at least one temperature sensor during said first molding cycle and said second molding cycle and supplying an amount of a temperature controlling medium to the first molding cycle and the second molding cycle, said amount of temperature controlling medium being dependant on the deviation between the actual temperature measured and the desired preset nominal temperature, the improvement comprising:

controlling, via a sensor, a plurality of flow control valves for the temperature controlling medium to provide impulse temperature control medium to the first and second molding cycles, determining empirically or by calculation a quantitative spacial distribution of temperature controlling medium needed to obtain said desired preset nominal temperature during at least the first molding cycle and the second molding cycle and determining empirically or by calculation the conduits needed to be utilized to obtain the desired preset nominal temperature during at least the first molding cycle and the second molding cycle, comparing said desired preset nominal temperature to said actual temperature, at least once during the first molding cycle and the second molding cycle at a point in time for each said molding cycle, such that said comparison made during said first cycle is synchronized with said comparison made during said second subsequent molding cycle, and said plurality of flow control valves are triggered during each said cycle to provide said impulse control medium, and said triggering being dependent on the deviation of temperature determined for each said comparison and also being dependent on a stored profile of said quantitative spacial distribution of the temperature controlling medium.

2. A method according to claim 1, wherein the flow per cycle of a cooling or heating medium is given by presetting the time of opening of each individual flow control valve in each individual cycle.

3. A method according to claim 1, wherein a flow measuring turbine is associated with each flow control valve to detect the actual flow in each cycle and wherein a proportioning of a cooling or heating medium is effected in dependence on a comparison of a nominal flow to the actual flow.

4. A method according to claim 1, wherein the flow rate of each individual flow control valve in each individual cycle is preset by the degree of opening of each flow control valve at a constant time of flow.

5. A method according to claim 1, wherein the flow rate of a heating medium per cycle is controlled by at least one of the flow control valves.

6. A method according to claim 1, wherein additionally provided electric heatings are triggered, individually proportioned in dependence on the temperature measured by the sensor.

7. A method according to claim 1, wherein a phase in the respective cycle is determined from the periodicity of a cycle-dependent temperature curve at the sensor.

8. A method according to claim 1, wherein a phase in the respective cycle is detected in dependence on the working cycle of the extruder.

9. A method of controlling the temperature of an injection mold of each molding cycle of a plurality of molding cycles comprising:

providing a plurality of control valves for delivering temperature adjusting medium to the injection mold via a plurality of conduits, providing a sensor to control the plurality of flow control valves, calculating an amount of temperature control medium needed to provide a preset mold temperature, calculating which conduits are to utilize the temperature control medium to provide the preset temperature, said sensor being set to compare the preset temperature with an actual temperature of the injection mold at a preset time of each molding cycle, said sensor calculating the temperature of the temperature control medium, and said sensor selectively opening and closing said control valves for a set period of time to provide an intermittent feed of control temperature medium to selected conduits to provide the preset temperature to the injection mold for said preset time.

* * * * *

UNITED STATES PATENT AND TRADEMARK OFFICE
CERTIFICATE OF CORRECTION

PATENT NO. : 5,427,720
DATED : June 27, 1995
INVENTOR(S) : Werner Kotzab

It is certified that error appears in the above-indentified patent and that said Letters Patent is hereby corrected as shown below:

Column 4, line 59, after "extruder" insert -- , --.

Signed and Sealed this

Seventh Day of November, 1995

Attest:

BRUCE LEHMAN

*Attesting Officer*　　　　*Commissioner of Patents and Trademarks*

(12) REEXAMINATION CERTIFICATE (4261st)
United States Patent
Kotzab

(10) Number: US 5,427,720 C1
(45) Certificate Issued: Jan. 30, 2001

(54) METHOD FOR MOLD TEMPERATURE CONTROL

(75) Inventor: Werner Kotzab, Heinestrasse 7, D-97422 Schweinfurt (DE)

(73) Assignee: Werner Kotzab, Schweinfurt (DE)

Reexamination Request:
No. 90/004,441, Nov. 4, 1996

Reexamination Certificate for:
Patent No.: 5,427,720
Issued: Jun. 27, 1995
Appl. No.: 08/201,976
Filed: Feb. 25, 1994

Certificate of Correction issued Nov. 7, 1995.

(30) Foreign Application Priority Data

Mar. 9, 1993 (DE) .................................. 43 07 347

(51) Int. Cl.⁷ .................................. B29C 45/73
(52) U.S. Cl. .................................. 264/40.6; 264/328.16; 425/144; 425/548
(58) Field of Search ................. 73/861.79, 861.89; 264/40.6, 328.16; 425/143, 144, 547, 548, 552

(56) References Cited

U.S. PATENT DOCUMENTS 5,046,370 * 9/1991 Hall .................................. 73/861.89

FOREIGN PATENT DOCUMENTS

92/08598 * 5/1992 (WO).

OTHER PUBLICATIONS

Kotzab, "Exakte Temperierung bei geringem Kostenaufwand", Plastverabeiter, vol. 35, No. 5, pp. 74–81, May 1984.*

Wieder, "Understanding the pulse modulated mold temperature control method", published by CITCO Products Incorporated, 1987.*

* cited by examiner

Primary Examiner—Jill L. Heitbrink

(57) ABSTRACT

The invention relates to a method of controlling the temperature of an injection mold, in particular for plastics and aluminium diecasting. The molten material being pressure-fed into the mold recess or the mold recesses of an injection mold by means of an extruder or the like in recurring cycles, cured therein, removed from the mold, and pressure-melted material being again supplied with the start of another cycle. A plurality of flow control valves are controlled by a sensor to provide an impulse or intermittent flow of the temperature control medium during each molding cycle at the same point in time as the previous cycle. The sensor compares a calculated temperature for a determined point in time of a molding cycle with the actual temperature of the molding cycle for that point in time and triggers the flow of temperature control medium for a set period of time to adjust the temperature of the molding cycle. This provides a more exact method of injection molding.

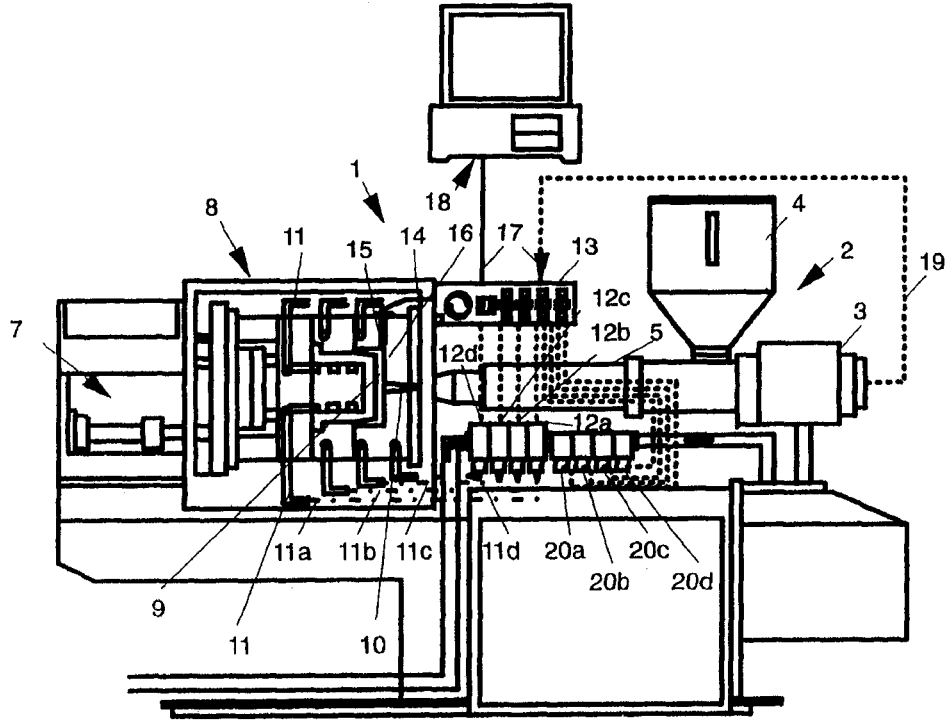

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 9 is confirmed.

Claim 1 is determined to be patentable as amended.

Claims 2–8, dependent on an amended claim, are determined to be patentable.

New claim 10 is added and determined to be patentable.

1. An improved method of controlling the temperature of an injection mold by pressure feeding molding material into a mold recess of an injection mold by an extruder, curing the material in the mold, and removing molded material from the mold, said pressure feeding, curing, and removing being a molding cycle of recurring molding cycles and said recurring molding cycles having at least a first molding cycle and a second molding cycle, comparing a preset nominal temperature to an actual temperature measured by at least one temperature sensor during said first molding cycle and said second molding cycle and supplying an amount of a temperature controlling medium to the first molding cycle and the second molding cycle, said amount of temperature controlling medium being dependent on the deviation between the actual temperature measured and the desired preset nominal temperature, the improvement comprising:

controlling, via a *single* sensor, a plurality of flow control valves for the temperature controlling medium to provide impulse temperature control medium to the first and second molding cycles, determining empirically or by calculation a quantitative spacial distribution of temperature controlling medium needed to obtain said desired preset nominal temperature during at least the first molding cycle and the second molding cycle and determining empirically or by calculation the conduits needed to be utilized to obtain the desired preset nominal temperature during at least the first molding cycle and the second molding cycle, comparing said desired preset nominal temperature to said actual temperature, at least once during the first molding cycle and the second molding cycle at a *certain point in time being the same* for each said molding cycle, such that said comparison made during said first cycle is synchronized with said comparison made during said second subsequent molding cycle, and said plurality of flow control valves are triggered during each said cycle to provide said impulse control medium, and said triggering being dependent on the deviation of temperature determined for each said comparison and also being dependent on a stored profile of said quantitative spacial distribution of the temperature controlling medium.

*10. The method of claim 3 wherein the rotation of said measuring turbine is transferred into pulses, the number of pulses per time being proportional to the actual flow per cycle, so that the nominal flow can be fixed by the presetting of a corresponding number of pulses.*

* * * * *